US005768825A

United States Patent [19]

Reiger

[11] Patent Number: 5,768,825
[45] Date of Patent: Jun. 23, 1998

[54] PLANT PRESERVATION BAG AND METHOD

[76] Inventor: Ralph E. Reiger, 7505 N. Broadway, Oklahoma City, Okla. 73116

[21] Appl. No.: 907,281

[22] Filed: Aug. 6, 1997

Related U.S. Application Data

[63] Continuation of Ser. No. 691,422, Aug. 2, 1996, abandoned, which is a continuation of Ser. No. 384,969, Feb. 7, 1995, abandoned.

[51] Int. Cl.[6] .................................................. A01G 9/02
[52] U.S. Cl. ........................................ 47/78; 47/76; 47/73
[58] Field of Search .................................. 47/58, 76, 78, 47/73

[56] References Cited

U.S. PATENT DOCUMENTS

| | | |
|---|---|---|
| 3,634,970 | 1/1972 | Williams ............................... 47/76 R |
| 4,098,021 | 7/1978 | Gruber . |
| 4,574,522 | 3/1986 | Reiger et al. . |
| 4,884,367 | 12/1989 | Lawton . |
| 4,888,914 | 12/1989 | Reiger . |
| 5,103,588 | 4/1992 | Reiger . |
| 5,142,821 | 9/1992 | Bell ....................................... 47/76 R |
| 5,167,092 | 12/1992 | Reiger . |
| 5,311,700 | 5/1994 | Thomas .............................. 47/76 WB |
| 5,368,353 | 11/1994 | Flanders et al. ........................ 47/76 |
| B1 4,884,367 | 11/1994 | Lawton . |

FOREIGN PATENT DOCUMENTS

| | | | |
|---|---|---|---|
| 6141708 | 5/1994 | Japan ........................................ 47/78 |
| 307774 | 7/1971 | U.S.S.R. .............................. 47/76 R |

*Primary Examiner*—Michael J. Carone
*Assistant Examiner*—Joanne C. Downs
*Attorney, Agent, or Firm*—McAfee & Taft

[57] ABSTRACT

A plant preservation and growth control bag and method of using the bag are provided. The bag includes an open top, a tapered side and a bottom and is formed of a porous fabric which catches plant roots and prevents root circulation, induces root branching within the bag and resists substantial root penetration. The bag is used in accordance with the method of the invention for preserving a plant while restricting the growth thereof after initially growing the plant in the ground and removing it therefrom in anticipation of transplantation.

14 Claims, 2 Drawing Sheets

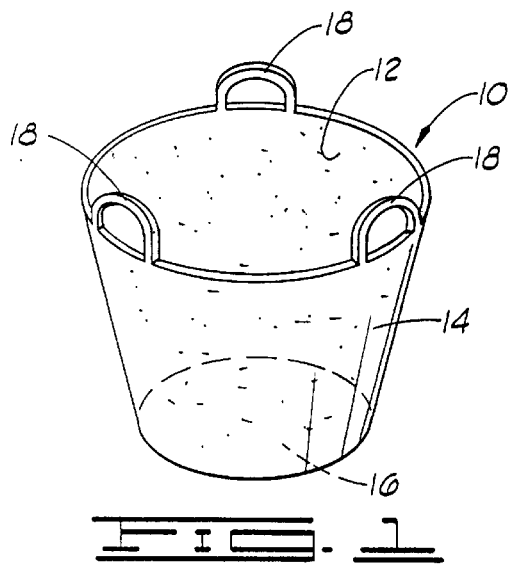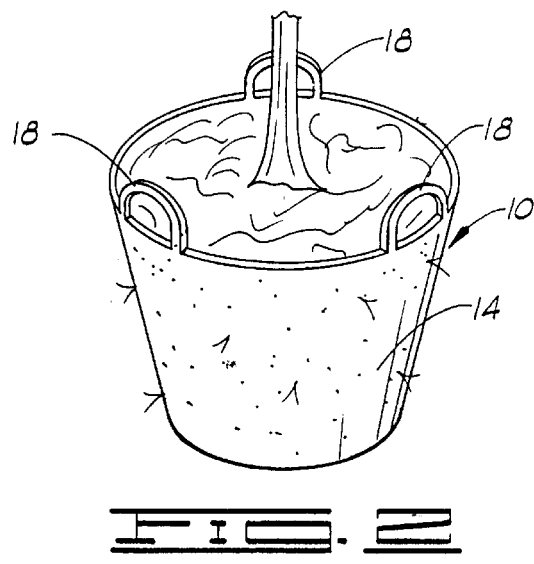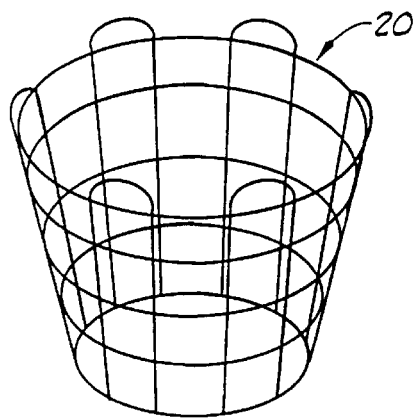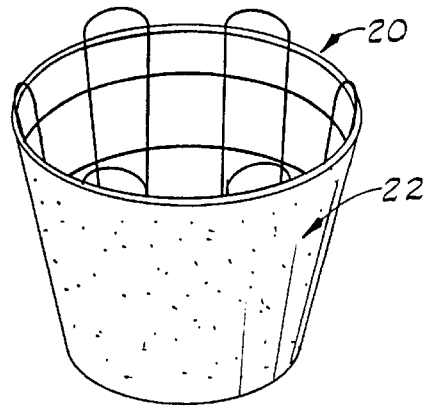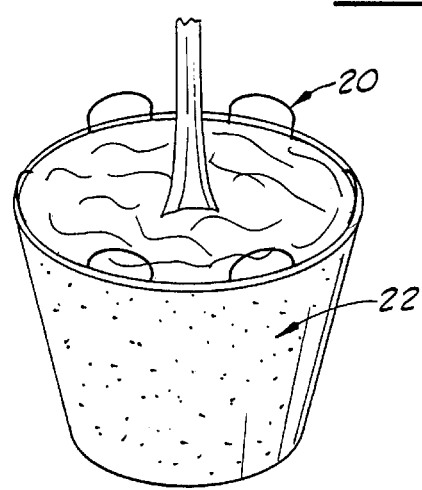

PLANT PRESERVATION BAG AND METHOD

This application is a continuation of application Ser. No. 08/691,422 filed on Aug. 2, 1996, now abandoned which is a continuation of application Ser. No. 08/384,969 filed Feb. 7, 1995, now abandoned.

BACKGROUND OF THE INVENTION

1. Field of the Invention

The present invention relates to a plant preservation and growth control bag and a method of using the bag for preserving a plant prior to transplantation.

2. Description of the Prior Art

The most widely used method of growing and producing relatively large sized landscape plants, e.g., trees and shrubs, is field growing. Millions of plants are planted in the field each year by growers with the intent to market the resulting grown plants several years later. For example, the number of small oak trees the grower plants in 1994 is governed by the number of grown oak trees, with 3" trunk diameter, standing 15 feet tall he estimates he can sell in 1998. The efficient grower wants to maximize his full capabilities. Therefore, the ultimate plan is to plant and grow the number of plants, of each species, the grower can sell several years later. Of course, accurately judging this futures market is a very difficult task, and consequently, many plants are grown and ready for sale with no ready market.

The plants are dug from the field after growing to the desired sale size. Most plants are dug using the ball and burlap method, either by hand or machine. An earth-root ball is formed and wrapped in burlap to hold the ball together. Wire baskets are also put around the ball to further secure it in handling and shipping until the plant is sold.

The time frame from digging to sale date always varies from days, weeks to many months. All during the time from digging the relatively large plants until they are ultimately replanted in a landscape situation, the plants must be properly cared for. The foremost consideration is keeping the root balls securely intact and providing sufficient water to the plants. It is during this time period when the plants have limited root systems with limited reservoirs for nutrients and moisture that they are most subject to stress.

The most common method heretofore employed in an attempt to accomplish the required plant care has been to place the plants in holding bins where the root balls are surrounded and covered by some type of mulching material (sawdust, wood chips, etc.) The mulching material holds the moisture and prevents drying of the root balls. The primary problems associated with this practice are that the burlap rots away and the root ball begins to deteriorate necessitating reburlapping with new material to hold the root balls together, and when the plants come out of dormancy (springtime), the leaves, stems and roots start new growth. The new root growth extends out of the root balls into the surrounding soil or growing media, and when the plants are removed from the soil or media the new root growth is lost causing the plants to suffer shock which leads to poor transplantation results.

Another prior method of large tree and shrub production has been to grow the plants in plastic containers or boxes where the root systems are totally confined to the container or box. As a plant reaches the desired selling and transplanting size appropriate to the size of the container in which it is being grown, root circulation commences within the container. It has long been recognized that root circulation leads to poor transplanting results and even eventual death of the plant.

Thus, when growers or processors of landscape plants do not have an immediate market for their plants when they are grown to optimum size, they have a need for an improved affordable method of preserving the plants that will carry the plants in good health but without appreciable growth to sale date.

Methods of growing nursery stock in the ground prior to transplanting such nursery stock whereby the root growth is confined in a porous fabric container are disclosed in U.S. Pat. No. 4,574,522 issued to Reiger et al. on Mar. 11, 1986, and U.S. Pat. No. 4,888,914 issued to Reiger on Dec. 26, 1989. In accordance with those methods, nursery stock, e.g., a seedling tree, is confined with a porous fabric container and planted in the ground within the container. The porous fabric container has sufficient strength to constrict roots which penetrate it whereby the root growth outside the container is limited and enlarged root nodule formation and root branching take place within the container. Upon transplanting the nursery stock, the container and nursery stock are unitarily removed from the ground and the restricted root growth outside the container readily breaks off or comes out of the ground. When transplanted, the container is removed from the root ball and the root ball is placed in the ground. Because of the nodule formation and root branching which took place in the container, the root ball rapidly expands whereby the plant is very quickly nourished and anchored in the ground.

While the methods of the above described patents are very useful and successful in growing nursery stock for transplantation, large plant growers more often follow the above described practice of growing seedlings in the field without root control to a size suitable for transplantation whereupon the plants are removed from the ground, the roots of the plants are wrapped in burlap and at least some of the plants are moved to the nursery or nearby storage location to await sale and ultimate transplantation.

Thus, there is a need for an improved method of preserving a plant and restricting its growth after initially growing the plant in the ground and removing it in anticipation of sale and transplantation.

SUMMARY OF THE INVENTION

By the present invention, a novel plant preservation and growth control bag and a method of using the bag to preserve a plant after initially growing the plant in the ground and removing it are provided which meet the above described needs.

The plant preservation and growth control bag of this invention confines the roots of a plant and restricts its growth after the plant has been initially grown in the field and removed therefrom in anticipation of sale and transplantation. The bag includes an open top, a continuous side and a bottom. The continuous side of the bag is tapered inwardly from the open top to the bottom, and is formed of a porous, needle punched fabric of fibers which are tangled and knotted as a result of being needle punched whereby plant roots are caught by the fabric, but penetration of the fabric by the roots is severely restricted. The bag is of an overall size which generally, but not necessarily, corresponds with the size of the root and soil mass produced when a plant is removed from the ground.

The method of this invention for preserving a plant while restricting its growth after the plant has been initially grown in the field and removed therefrom in anticipation of transplantation basically comprises the steps of placing the root and soil mass of the plant in a plant preservation and growth control bag of the invention, and providing water to the plant within the bag.

The fabric of the bag catches the plant roots as they grow within the bag, pruning the roots and preventing root circulation. However, the bag is of sufficient strength to severely restrict penetration of the fabric by the roots. As a result, except for a few small roots, the roots of the plant are confined within the bag. While the plant remains healthy in the bag, it does not appreciably grow while its roots are confined therein. Thus, the plant may be preserved for future sale by the grower for a long period of time.

It is, therefore, a general object of the present invention to provide a plant preservation bag and method of using the bag for preserving a plant for transplantation.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a perspective view of a plant preservation and growth control bag of the present invention.

FIG. 2 is a perspective view of the bag of FIG. 1 after the roots of a tree and soil have been placed therein.

FIG. 3 is a perspective view of a prior art wire basket utilized for receiving the roots and soil of a plant removed from the ground using a conventional tree spade.

FIG. 4 is a perspective view of the wire basket of FIG. 3 having a plant preservation bag of the present invention placed therearound.

FIG. 5 is a perspective view of the wire basket and bag of FIG. 4 after the roots of a tree and soil have been placed therein.

DESCRIPTION OF PREFERRED EMBODIMENTS

Figure 6:
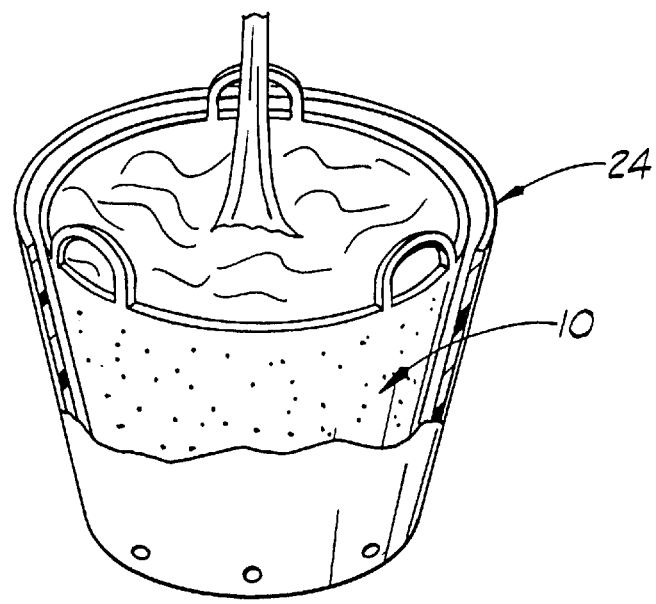
FIG. 6 is a side partially sectional perspective view of a pot containing a plant preservation bag having the roots of a tree and soil therewithin.

Referring now to the drawings and particularly to FIG. 1, a plant preservation and growth control bag 10 of the present invention is illustrated. The bag 10 has a circular open top 12, a continuous side 14 and a circular bottom 16. The continuous side 14 is tapered inwardly from the open top 12 to the bottom 16. Thus, in the preferred configuration illustrated in FIG. 1, the bag 10 is of an inverted truncated cone shape.

Figure 7:
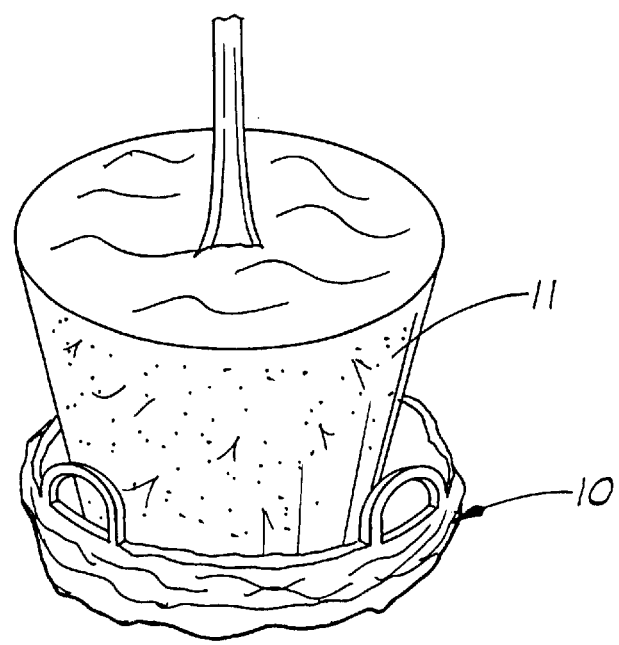
FIG. 7 is a perspective view of the root growth and soil mass of a tree after being preserved in a plant preservation bag of the present invention and the bag removed therefrom.

While the bag 10 can have various other shapes, the tapered side 14 is essential in that it makes the bag 10 easily removable from the root growth and soil mass 11 of a plant which has been confined in the bag 10 for some period of time as shown in FIG. 7. Also, the inverted truncated cone shape of the bag 10 is preferred for the reason that it corresponds to the shape of the root and soil mass of a plant removed from the ground utilizing a conventional mechanized plant spade.

In a particularly preferred form, the bag 10 includes two or more, and preferably three, handles 18 attached to the open top 12 thereof for lifting the bag 10 and the plant contained therein. FIG. 2 illustrates the bag 10 with the roots of a tree and soil therein.

Referring now to FIG. 3, a prior art wire basket 20 is shown which has heretofore been utilized by tree growers. The basket 20 has an inverted truncated cone shape for receiving the roots and soil of a tree when the tree is removed from the ground using a conventional mechanized tree spade. The wire basket 20 is utilized for moving the tree and for facilitating its transplantation.

As illustrated in FIG. 4, a plant preservation and growth control bag 22 of the present invention can be placed in or over the prior art wire basket 20 so that the method of the present invention can be performed using the prior art basket 20. FIG. 5 illustrates the wire basket 20 and bag 22 with the roots of a tree and soil therein.

As mentioned, the plant preservation and growth control bags 10 and 22 are formed of a porous, needle punched fabric of fibers which are tangled and knotted as a result of being needle punched whereby roots growing within the bags are caught by the fabric, but penetration of the fabric by the roots is restricted and curtailed.

A suitable porous, needle punched fabric for use in accordance with the present invention is a non-woven fabric marketed by Amoco Corporation, formally by Phillips Fibers Corporation. Typically, the fabric is manufactured from synthetic staple fibers made into batts. The batts are subjected to stretching while being needle punched. The methods and equipment for producing the fabric are described in U.S. Pat. Nos. 4,042,655 issued to Platt et al. in Aug. 1977; 4,154,889 issued to Platt in May, 1979 and 4,199,644 issued to Platt in April, 1980.

The fabric of staple fibers which is needle punched can be formed using fibers of polyolefin, polyester, polyamide or mixtures thereof. A preferred such staple fiber fabric for forming the plant preservation bag of the present invention is a heavy (8 oz. or heavier) fabric formed of polypropylene staple fibers which is strongly heat bonded on one side. The heat bonded side of the fabric is placed on the outside of the bag with the non-heat bonded rough side on the inside of the bag to catch root tips, induce root branching and prevent root circulation. A particularly suitable such non-woven staple fiber fabric for use in accordance with this invention is manufactured by Spartan Technologies of Spartanburg, S.C. and identified as ST 80 fabric (8 oz) having a puncture strength of 115 pounds.

Heavy needle punched fiber fabrics which are formed of continuous fibers can also be utilized. For example, non-woven needle-punched fabrics formed of continuous polyolefin fibers, polyester fibers and/or polyamide fibers can be used. As in the case of staple fiber fabrics, the continuous fiber fabrics are preferably 8 oz. or heavier and are fused by heating after being tangled and knotted by needle punching to provide strength for resisting root penetration and for resisting the enlargement of those roots that do penetrate the fabric. A particularly suitable porous, needle punched fabric formed of non-woven continuous fibers is manufactured by Polyfelt Incorporated of Evergreen, Ala. under the trade designation "TS".

Another fabric which is suitable for use in accordance with this invention is formed of woven continuous fibers. The woven continuous fibers form a substrate and prior to being needle punched, one or more layers of staple fibers are placed on the substrate. The staple fibers and substrate are then needle punched whereby the staple fibers are attached to one side of the substrate forming a highly fuzzy surface thereon. The continuous and staple fibers are preferably selected from the group consisting of polyolefin fibers, polyester fibers, polyamide fibers and mixtures thereof.

Most preferably, both the continuous fibers and staple fibers are formed of polypropylene. When the resulting fabric is utilized to form a bag in accordance with the present invention, the fuzzy surface is placed on the inside of the bag whereby root tips are readily caught therein and prevented from circulating within the bag. A suitable fabric of this type is manufactured by the Polymers Group of Exxon Chemical Company.

Thus, the plant preservation and growth control bag of the present invention can be formed of staple or continuous fibers, or both, selected from polyolefin fibers, polyester fibers and/or polyamide fibers. However, it is essential to the present invention that the fiber fabric utilized be a heavy fabric which has been tangled and knotted by needle punching to the degree that a major portion of the root tips growing within the fabric do not penetrate the fabric and that any root tips that do penetrate are choked off by the fabric whereby they do not enlarge outside the fabric. As indicated, increased strength can be imparted to the fabric by heat bonding the fibers.

The method of the present invention preserves a plant while restricting its growth after the plant has been initially grown in the field and removed therefrom in anticipation of transplantation.

A typical circumstance in which the method of this invention can advantageously be employed involves the commercial growing and selling of plants such as trees for transplantation. As mentioned above, the trees are field planted as seedlings and grown to a desired size for sale and transplantation. During dormancy, sales for the trees are arranged, the trees are dug and burlapped, and the trees are delivered and transplanted. For example, when a grower has a block of dormant 3" caliper trees ready and available for sale, the trees which have been sold will be harvested using a 32" Clegg mechanized tree spade. The root balls will be wrapped in burlap and placed in 32" Clegg baskets similar to the basket 20 illustrated in FIG. 3. The harvested trees will then be delivered to customers. If the remaining trees are not harvested, they will in time grow to a larger size than the growers 32" tree spade or labor can handle for successful transplantation.

When a grower elects to dig his unsold trees or shrubs, the burlapped balls of the unsold trees or shrubs have commonly been placed in holding bins and covered with mulching material, placed in shallow holes and covered with soil or placed in above-ground or in-ground pots while awaiting sale and transplantation. Water is provided to each plant. After dormancy, the plants and their roots continue to grow while they await sale. If the plants are not quickly sold, they often must be reburlapped and/or suffer from lack of nutrients and water.

In accordance with the present invention, when the plants grown for transplantation are removed from the field, the root and soil masses are placed in plant preservation bags of the present invention instead of being wrapped in burlap. As mentioned, the root and soil masses can each be placed in a bag 10 having handles 18 thereon for facilitating the subsequent movement and transplantation of the plants as shown in FIG. 2. Alternatively, the root and soil masses can each be placed in a prior art wire basket 20 having a plant preservation bag 22 around or in the basket as shown in FIG. 5.

Once the plants are placed in the preservation bags of this invention with or without wire baskets, the bags containing the plants can be placed on top of the ground and supplied with water or the bags and roots can be put back into the ground. In either arrangement, root tips within the bags are caught by the bags but are substantially prevented from penetrating the bag. Because the roots are caught by the bag, they are substantially prevented from circulating therewithin. Any root tips which do penetrate the bags are air pruned when the bag is above ground or choked off when the bag is below ground, inducing new root branching within the bag. Also, if needed to provide stability to the plants, the bags containing the root and soil masses with or without wire baskets, can be placed in above-ground or in-ground pots like the pot 24 shown in FIG. 6.

In areas subject to high winds and/or cold weather, the preservation bags containing the plant root and soil masses can be protected from blowing over or freezing by being placed directly in the ground or in in-ground pots. When the bags containing the root and soil masses are placed in the ground, the roots which penetrate the bag are few in number, are constricted and are of small size whereby they readily break off. The plants can be lifted from the ground very easily by means of the bag handles or wire basket rings with little or no spade work.

While a large plant remains healthy when its roots are confined within the fabric bag of this invention, the plant does not appreciably grow due to the near total confinement of the roots of the plant in the bag. The fuzzy nature of the bag prevents root circulation and a more fibrous root system develops which helps the tree flourish when transplanted. The confining of the plant roots in the bag allows a grower a much longer time frame in which to market his plants. It allows a field grower to make summer sales of trees in full leaf, a practice not customarily followed today.

The fabric bag 10 provides a tough durable shipping container with handles to facilitate its movement. In larger sizes (approximately 20 gallons and up) the bag 10 is more economical to use than plastic containers. When a plant preserved in the bag 10 is transplanted, the bag 10 is easily removed from the root and soil mass 11 as illustrated in FIG. 7 and reused.

Thus, the present invention is well adapted to carry out the objects and attain the ends and advantages mentioned as well as those which are inherent therein. While numerous changes in the steps of and fabrics utilized in accordance with the methods of this invention can be made by those skilled in the art, such changes are encompassed within the spirit of this invention as defined by the appended claims.

What is claimed is:

1. A method of preserving a landscape plant while restricting the growth thereof after initially field growing the plant without restriction in the ground and removing it therefrom along with a root and soil mass having a shape generally corresponding to an inverted truncated cone in anticipation of transplantation comprising the steps of:

field growing the plant without restriction to a desired transplantation size;

placing said root and soil mass of said landscape plant in an inverted truncated cone shaped plant preservation and growth control bag having an open top, a continuous side and a bottom, said side being tapered inwardly from said open top to said bottom and being formed of a porous, needle punched fabric of fibers which are tangled and knotted as a result of being needle punched whereby said roots are caught by said fabric but penetration of said fabric by said roots is severely restricted thereby restricting further growth of said plant, said fabric substantially preventing said roots from circulating in said bag; and providing water to said plant within said bag, said bag maintaining its truncated cone shape after said root and soil mass has been placed therein.

2. The method of claim 1 which further comprises the steps of excavating a hole in the ground and placing said bag with said root and soil mass contained therein in said hole.

3. The method of claim 1 or 2 which further comprises the step of placing said bag in or over a wire basket prior to placing said root and soil mass therein.

4. The method of claim 1 which further comprises the step of placing said bag with said root and soil mass contained therein in an above-ground pot.

5. The method of claim 1 which further comprises the step of placing said bag with said root and soil mass contained therein in an in-ground pot.

6. The method of claim 1 wherein said fibers are staple or continuous fibers selected from the group consisting of polyolefin fibers, polyester fibers, polyamide fibers and mixtures thereof.

7. The method of claim 6 wherein said fibers are heat bonded.

8. A method of preserving a tree and restricting the growth thereof while awaiting the transplantation of the tree comprising the steps of:

initially field growing said tree in the ground without restriction to a desired size for transplantation;

removing said tree along with a root and soil mass having a shape generally corresponding to an inverted truncated cone from the ground;

placing said root and soil mass of said tree in a plant preservation and growth control bag having an open top, a continuous side and a bottom, said side being tapered inwardly from said open top to said bottom and being formed of a porous, needle punched fabric of fibers which are tangled and knotted as a result of being needle punched whereby said roots are caught by said fabric but penetration of said fabric by said roots is severely restricted thereby restricting further growth of said tree and whereby circulation of said roots in said bag is substantially prevented by said fabric; and providing water to said tree within said bag, said bag maintaining its shape so that said side tape inwardly from said open top to said bottom after said placing step.

9. The method of claim 8 which further comprises the steps of excavating a hole in the ground and placing said bag with said root and soil mass contained therein in said hole.

10. The method of claim 8 or 9 which further comprises the step of placing said bag in or over a wire basket prior to placing said root and soil mass therein.

11. The method of claim 8 which further comprises the step of placing said bag with said root and soil mass contained therein in an above-ground pot.

12. The method of claim 8 which further comprises the step of placing said bag with said root and soil mass contained therein in an in-ground pot.

13. The method of claim 8 wherein said fibers are staple or continuous fibers selected from the group consisting of polyolefin fibers, polyester fibers, polyamide fibers and mixtures thereof.

14. The method of claim 13 wherein said fibers are heat bonded.

* * * * *

UNITED STATES PATENT AND TRADEMARK OFFICE
CERTIFICATE OF CORRECTION

PATENT NO. : 5,768,825
DATED : June 23, 1998
INVENTOR(S) : Ralph E. Reiger

It is certified that error appears in the above-indentified patent and that said Letters Patent is hereby corrected as shown below:

Claim 8, line 21 (column 8, line 10), delete "tape" and insert --tapers-- therefor.

Signed and Sealed this

Eighteenth Day of August, 1998

Attest:

BRUCE LEHMAN

Attesting Officer

Commissioner of Patents and Trademarks